US005117546A

United States Patent [19]

Lawrence et al.

[11] Patent Number: 5,117,546

[45] Date of Patent: Jun. 2, 1992

[54] APPARATUS AND METHOD FOR REPLACING A BULL GEAR ON A TRUNNION

[75] Inventors: Craig J. Lawrence, Nazareth; James L. Marino, Bethlehem, both of Pa.

[73] Assignee: Bethlehem Steel Corporation, Bethlehem, Pa.

[21] Appl. No.: 716,047

[22] Filed: Jun. 17, 1991

[51] Int. Cl.5 .............................................. B23P 19/04

[52] U.S. Cl. ........................................ 29/252; 254/105

[58] Field of Search .................... 29/252, 281.1, 281.3, 29/281.5; 254/1, 105, 133 R, DIG. 4

[56] References Cited

U.S. PATENT DOCUMENTS

| | | | |
|---|---|---|---|
| 2,488,478 | 11/1949 | Pine | 29/252 |
| 2,509,305 | 5/1950 | Landis | 29/252 |
| 2,573,567 | 10/1951 | Hancock | 29/252 |
| 3,056,477 | 10/1962 | Wooley | 29/252 |
| 4,212,450 | 7/1980 | Lambert | 254/105 |
| 4,214,362 | 7/1980 | Beard | 29/252 |
| 4,328,608 | 5/1982 | Gibson | 29/252 |
| 4,768,835 | 9/1988 | Kalantarov et al. | 254/105 |

*Primary Examiner*—J. J. Swann
*Attorney, Agent, or Firm*—Harold I. Masteller, Jr.

[57] ABSTRACT

An apparatus for installing a new bull gear onto a trunnion shaft of a BOF, the apparatus comprising a first stop removably attached to the end face of a turnnion shaft, a gear press shaft extending through an aperture within the first stop means, the gear press shaft having a first end portion with an enlarged segment inserted into a recess provided within the trunnion shaft, a second stop adjustably attached to a second end portion of the gear press shaft, a gear press plate removably attached to the gear and encircling the gear press shaft between the first and second stops and a jack means located between the gear press plate and the second stop.

7 Claims, 2 Drawing Sheets

Fig. 1
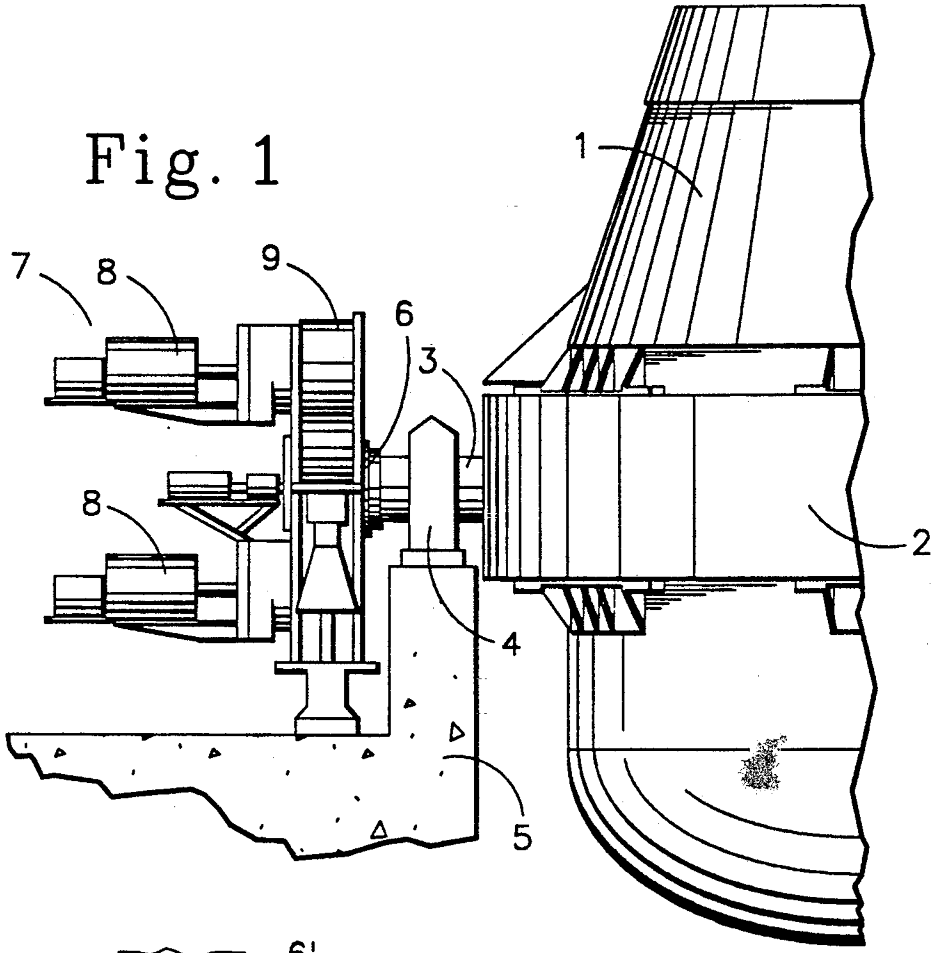
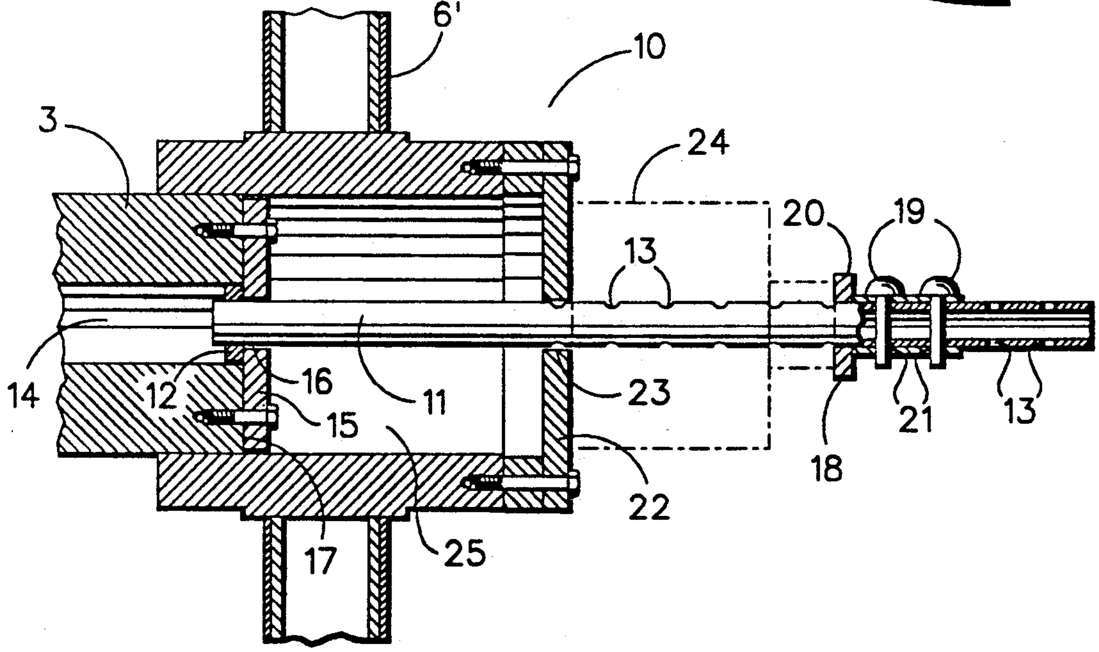
Fig. 2

APPARATUS AND METHOD FOR REPLACING A BULL GEAR ON A TRUNNION

BACKGROUND OF THE INVENTION

This invention relates to the apparatus and a method for installing a new bull gear on the trunnion shaft of a BOF or basic oxygen furnace. The steelmaking vessel in a BOF is supported by a gimbal like suspension system which tranmits loads to a pair of trunnion shafts journaled within bearings mounted on the structural foundation. A large diameter bull gear is attached to one end of the trunnion shaft on the drive side of the BOF, and a drive means, which includes a plurality of motors, pinions and brakes, drives the bull gear to rotate the steelmaking vessel about a horizontal axis.

Occasionally, throughout the long service life of a BOF, it may become necessary to replace a worn bull gear. In the past, such refittings have been very labor intensive as the workers struggle to handle the immense furnace parts and use their own innovative skills to apply force and leverage to install the new gear.

One past procedure, which is still used to install a new bull gear onto a trunnion shaft, comprises drilling, taping and threading, into the end face of the drive side trunnion shaft, long studs which extend in a direction away from the shaft face. The long studs are arranged to correspond with apertures extending through a plate which is bolted to one face of the new bull gear. An overhead crane is used to align the new bull gear with the trunnion shaft and the apertures of the plate are carefully adjoined with the threaded studs. Spacers and nuts are then threaded onto the studs and impact wrenches are used to slowly tighten the nuts and force the new ball gear onto the shaft. The described refitting procedure of the past has been known to take as long as up to 24 hours to complete the installation of a new bull gear.

SUMMARY OF THE INVENTON

It is therefore an object of this invention to provide an efficient gear press to reduce the time required to install a new bull gear onto a trunnion shaft.

It is a further object of this invention to provide a gear press which is easily attached to a trunnion shaft.

It is still a further object of this invention to provide a gear press having means for supporting and aligning a bull gear with a trunnion shaft.

It is still a further object of this invention to provide an efficient gear press having a jack means capable of being easily positioned to force a bull gear onto a trunnion shaft.

We have discovered that the foregoing objects can be attained with a gear press comprising a first stop means removably attached to an end face of a trunnion shaft, a gear press shaft extending through an aperture within the first stop means and including a first end portion having an enlarged segment inserted into a recess provided within the trunnion shaft, a second stop means adjustably attached to a second end portion of the gear press shaft, a gear press plate removably attached to the new bull gear being refitted onto the trunnion shaft and encircling the gear press shaft between the first and second stop means a jack means located between the gear press plate and the second stop means.

BRIEF DESCRIPTION OF THE DRAWINGS

FIG. 1 is an elevational view of the drive side of a basic oxygen furnace.

FIG. 2 is a cross-sectional view of the preferred embodiment of the gear press invention.

DETAILED DESCRIPTION OF THE PREFERRED EMBODIMENT

Figure 3:
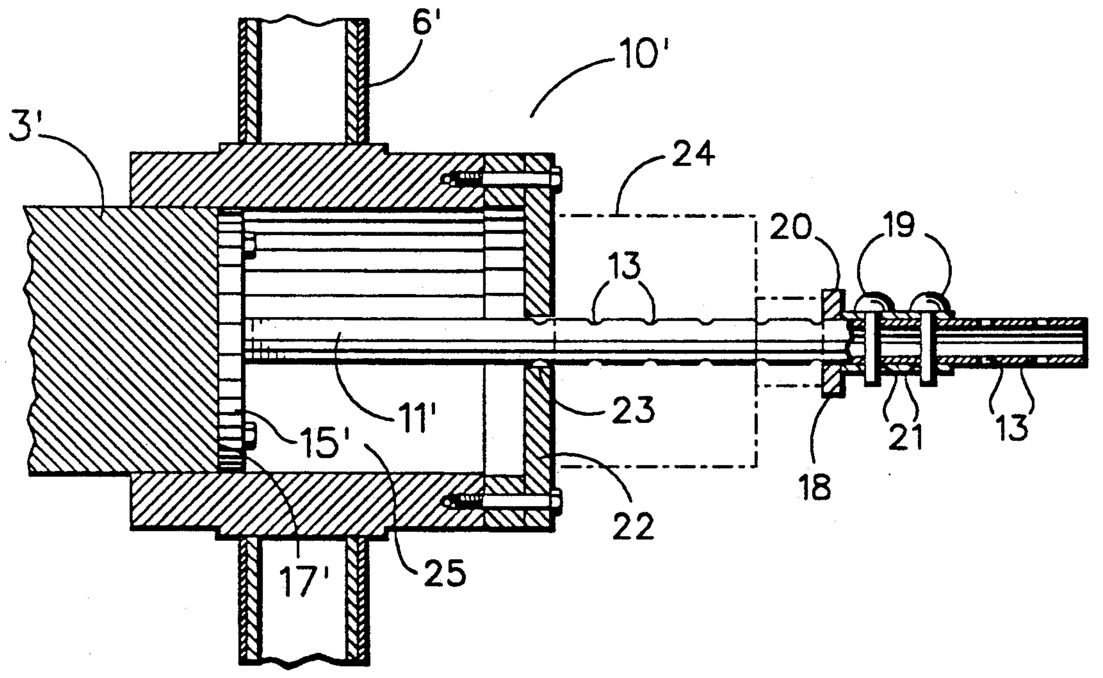
FIG. 3 is a cross-sectional view similar to FIG. 2 showing an alternate embodiment of the gear press invention.

Referring to FIG. 1 of the drawings, a steelmaking vessel 1 is shown supported by a trunnion ring 2 and a trunnion shaft 3 journaled within a bearing 4 supported upon the structural foundation 5 of a BOF. A bull gear 6 is attached to one end of the drive side trunnion shaft 3 and a drive mechanism 7, employing a series a motors 8, pinions 9 and braking devices, drives bull gear 6 in either a clockwise or counterclockwise direction to cause the steelmaking vessel to rotate about a horizontal axis during the steelmaking operations.

It has been found that an occassion, throughout the service life of a BOF, a bull gear may wear to a point where it is necessary to refit the drive side trunnion shaft 3 with a new gear. FIG. 2 shows the preferred embodiment of the invention used to install such a new bull gear on the drive side trunnion shaft. Shown generally as 10, the preferred embodiment of the gear press device is an assemblage comprising a gear press shaft 11, a first stop means 15, a second stop means 18, a gear press plate 22 and, shown in phantom lines, a jack means 24.

Gear press shaft 11 includes an enlarged segment or collar 12 attached to a first end portion of shaft 11 and a plurality of apertures 13 longitudinally spaced along a second end portion opposite collar 12. Apertures 13 extend through shaft 11 in a direction perpendicular to the longitudinal axis of the shaft and the first end portion of shaft 11, including the enlarged segment or collar 12, is inserted into a substantially horizontal recess or bored hole 14 within the drive side trunnion shaft.

The first stop means 15 of the gear press invention is provided with a centrally located aperture 16 which slideably encircles gear press shaft 11. The first stop means 15 is attached to the end face 17 of the drive side trunnion 3 with removable fasteners and effectively closes off the open end of recess 14 to capture the enlarge segment or collar 12 of shaft 11 within the recess of the drive side trunnion shaft.

The second stop means 18 includes an enlarged portion 20 at one end for engaging a jack means 24 and apertures 21 spaced along its length to correspond with apertures 13 of gear press shaft 11. Second stop 18 is adjustably attached to the second end portion of shaft 11 by means of removable fasteners 19 inserted through apertures 13 and 21.

The gear press plate 22, located between the first stop means 15 and the second stop means 18, is provided with a centrally located aperture 23 to slideably encircle and support gear press shaft 11. Gear press plate 22 is removably attached to one face of the new bull gear 6' with bolts or other removable fastening means, and the jack means 24 is positioned to operate between the gear press plate 22 and the enlarged end 20 portion of second stop means 18.

In order to refit the drive side trunnion shaft 3 with a new bull gear 6', the first end portion of gear press shaft 11, including its enlarged segment 12, is first inserted into recess 14 of the drive side trunnion shaft. The first stop means 15 is then fastened to the end face 17 of trunnion shaft 3 with the gear press shaft 11 extending through its centrally located aperture 16. The gear press plate 22 is then attached to one face of the new bull gear 6' and a crane, or other lift means, is used to place the new bull gear adjacent the drive side trunnion 3 with the gear press shaft 11 extending through the centrally located aperture 23 of the gear press plate. The jack means 24, which in the preferred embodiment includes a hollow central lift, is next placed onto gear press shaft 11 and one end of the jack is positioned adjacent the gear press plate 22. The second stop means 18 is next positioned along the second end portion of gear press shaft 11 with its enlarged portion 20 placed adjacent the retracted piston of the jack means 24 and the apertures 21 are aligned with apertures 13 of the gear press shaft. Removably fasteners 19 are then inserted through apertures 21 and 13 attaching the second stop means to the gear press shaft 11.

To jack or force the new bull gear 6' onto the drive side trunnion 3, the crane supporting the new bull gear is operated to axially align the central bore 25 of the new bull gear with the outside diameter of the drive side trunnion shaft 3 and the jack means 24 is operated to extend its piston and begin forcing the new bull gear onto trunnion shaft. After the piston has reached the end of its stroke, the jack means is operated in reverse to retract the piston, the fasteners 19 are removed from apertures 13 and 21 and the second stop means 18 is adjusted to its new position, along the length of shaft 11, adjusting the retracted piston and aligned with a new set of corresponding apertures 13. The removable fasteners 19 are once again inserted through apertures 13 and 21 and the jack is operated to advance the new bull gear to a new position along the length of the trunnion shaft. The alternating jacking of the gear and repositioning of the adjustable second stop means continues until the new bull gear is advanced to its final position along the length of the drive side trunnion shaft 3.

Referring to FIG. 3 of the drawings, an alternate embodiment of the gear press invention is shown a comprising a modified gear press shaft 11' having a first end portion which includes an enlarged end 15' for attachment to an end face of a solid shaft. The alternate gear press embodiment 10' provides a method for refitting a new gear 6' onto a solid shaft or trunnion 3' by first removably attaching the enlarged end 15', of the modified gear press shaft 11', to an end face 17' of a solid shaft 3'. The gear press plate 22 is then attached to the new gear 6' as before and the new gear is refitted onto the solid shaft or trunnion 3' as heretofore described for the hollow trunnion shaft 3 shown in the preferred embodiment.

While this invention has been illustrated and described in accordance with a preferred embodiment and one alternate embodiment, it is recognized that variations and changes may be made therein without departing from the invention as set forth in the claims.

We claim:

1. An apparatus for installing a gear or a hollow shaft comprising:

a) a first stop means including a central aperture, said first stop means being removably attached to an end face of said hollow shaft, b) a gear press shaft extending through the central aperture of said first stop means, said gear press shaft having a first end portion and a second end portion where the first end portion is inserted into a recess provided within said hollow shaft and includes an enlarged segment for engaging said first stop means and retaining said first end portion within said recess and where the second end portion includes a plurality of apertures spaced along the length thereof, c) a second stop means adjustably attached to the second end portion of said gear press shaft, d) a gear press plate including a central aperture, said gear press plate being removably attached to said gear and encircling said gear press shaft between said first stop means and said second stop means, and e) a jack means located between said gear press plate and said second stop means.

2. The apparatus as described in claim 1 wherein said second stop means includes adjustment means to coincide the position of said second stop means along the length of said gear press shaft with the advancement of said gear along the length of said hollow shaft.

3. The apparatus as described in claim 2 wherein said second stop means includes an enlarged end portion for engaging said jack means and apertures for receiving removable fasteners, said apertures spaced to correspond with the apertures of said gear press shaft.

4. The apparatus as described in claim 1 wherein said hollow shaft is a trunnion shaft on a metallurgical furnace.

5. An apparatus for installing a gear on a solid shaft comprising:

a) a gear press shaft having a first end portion and a second end portion where said first end portion includes an enlarged portion being removably attached to a face of said solid shaft and said second end portion includes a plurality of apertures spaced along the length thereof, c) a stop means adjustably attached to the second end portion of said gear press shaft, d) a gear press plate including a central aperture, said gear press plate being removably attached to said gear and encircling said gear press shaft between the first end portion of said gear press shaft and said stop means, and e) a jack means located between said gear press plate and said stop means.

6. The apparatus as described in claim 5 wherein said stop means includes adjustment means to coincide the position of said stop means along the length of said gear press shaft with the advancement of said gear along the length of said hollow shaft.

7. The apparatus as described in claim 6 wherein said stop means includes an enlarged end portion for engaging said jack means and apertures for receiving removable fasteners, said apertures spaced to correspond with the apertures of said gear press shaft.

* * * * *